United States Patent [19]
Wurzburger et al.

[11] Patent Number: 5,698,107
[45] Date of Patent: Dec. 16, 1997

[54] TREATMENT FOR ACID MINE DRAINAGE

[76] Inventors: Stephen Ray Wurzburger, P.O. Box "C", Goodyear's Bar, Calif. 95944; James Michael Overton, 1127 Nickel La., Yuba City, Calif. 95991

[21] Appl. No.: 613,606

[22] Filed: Mar. 11, 1996

[51] Int. Cl.$^6$ .................................................. C02F 1/461
[52] U.S. Cl. .................... 210/695; 210/716; 210/724; 210/726; 210/748; 210/912; 205/742; 205/771
[58] Field of Search ............................ 210/695, 702, 210/709, 716, 717, 723, 724, 726, 738, 748, 912; 205/742, 771

[56] References Cited

U.S. PATENT DOCUMENTS

| | | | |
|---|---|---|---|
| 3,511,777 | 5/1970 | Spinola | 210/49 |
| 4,014,766 | 3/1977 | Watanabe | 205/746 |
| 4,169,035 | 9/1979 | Stummer et al. | 204/260 |
| 4,176,057 | 11/1979 | Wheatley et al. | 210/137 |
| 4,695,378 | 9/1987 | Ackman | 210/198 |
| 5,401,420 | 3/1995 | Siefert et al. | 210/912 |
| 5,423,962 | 6/1995 | Herbst | 204/149 |
| 5,427,691 | 6/1995 | Kuyucak et al. | 210/724 |
| 5,443,719 | 8/1995 | Johnson et al. | 210/101 |

*Primary Examiner*—Peter A. Hruskoci
*Assistant Examiner*—Betsey J. Morrison
*Attorney, Agent, or Firm*—Robert Samuel Smith

[57] ABSTRACT

An apparatus and method for removing contaminating metal ions and sulfate ions from acidic aqueous solution such as waste mine water which features passing the solution between pairs of electrodes, each pair of electrodes impressed with a voltage selected according to specific ion species and then adding chemical agents to raise the pH and form precipitates of the metal and sulfate ions. The precipitate is then separated from the water with settling and filtering steps. Application of a magnetic field is applied during at least the first mixing step.

11 Claims, 3 Drawing Sheets

TREATMENT FOR ACID MINE DRAINAGE

FIELD OF THE INVENTION

This invention relates to methods for the removal of contaminating heavy and light metal ions from aqueous solutions such as acid mine drainage and particularly to a method which incorporates magnetic, electrolytic and chemical techniques.

BACKGROUND AND PRIOR ART

Acid mine drainage (A.M.D.) results from oxidation of metal sulfide minerals, primarily pyrites and other sulfide ores. The acidic reaction products are absorbed by the descending waters and rising subsurface waters which enter the surface water ecosystems. Some large mine sites currently generate an excess of six million gallons A.M.D. per day. One particular mine site, located in Northern California, generates 25% of the total metal contamination entering the ground water supply of the entire United States.;

One A.M.D. treatment process of the prior art consists of four steps:
(1) neutralization
(2) aeration
(3) settling and disposal of sludge
(4) effluent discharge.

The neutralization, aeration and settling equipment are expensive and require large structures and excavation for large treatment facilities (U.S. Pat. No. 4,695,378).

A second A.M.D. treatment of the prior art includes raising the pH from the acid range to the basic range by mixing with lime. The cation constituents combine with the calcium carbonate to generate bi-carbonates. The sulfate ion $SO_4$ remains in large concentrations in the treated water. (See U.S. Pat. No. 3,511,777)

Another standard method that is widely used for removing metals from acid waters is a pH control method in which calcium hydroxide is added to the waste stream to raise the pt. With single valency metal contaminants, most of the metal can be removed by raising the pH of an initially highly acidic solution to 8.5. With high valency metal ions, the pH must be raised to above 10.5+. The sludge generated in some of these cases has required the use of separators in place of the more economical filters.

The major problem encountered with hydroxide precipitation processes with multiple metal contaminants is the wide range of solubilities of the formed hydroxide precipitates. In order to precipitate most of metals, the pH must be raised to 10.5 to 11.0. When the basic solution is later neutralized, some of the metal goes back into solution and recontaminates the water.

In acid industrial waste water, the heavy metal ions are usually singly charged. (A notable exception is the effluents from electroplating processes.) Natural contaminated water typically contains several ionic states of the same metal. Each ionic state, when combined with a neutralizing compound containing OH, forms metal hydroxides of varying stoichiometries. Some of these hydroxides are insoluble precipitates. Most of the generated hydroxides are characterized by a strongly pH dependent solubility. These soluble hydroxides in some cases can be partially removed by physical adsorption or crystal chemical inclusion (chemisorption) and may be lowered to acceptable levels.

The use of sodium, potassium, and calcium hydroxides create a metal bearing sudge that is very difficult to filter effectively and the metal hydroxide cake is hopelessly cross contaminated so as to be beyond economical separation and recovery. They are therefore not feasibly recoverable nor recyclable and are classified as hazardous waste with all the problems and expense of hazardous waste storage.

Treatments of waste water containing large concentrations of waste water produces water having a large concentration of $SO_4$—even though the pH is in an otherwise acceptable range.

The Iron Mountain Mine Site located near Redding, Calif. and the Berkeley Pit located at Butte, Mont., are particularly notorious examples of the undesireable environmental impact of A.M.D At the Iron Mountain Site, there are fifteen or more highly toxic contaminating metals present, some in large quantities. The A.M.D. waste water from Iron Mountain in Calfornia has a pH between 0.58 to 0.75.

Table I lists the average concentration over a twelve month period in the Iron Mountain Mine Site.

TABLE I

| | |
|---|---|
| Aluminum | 2300 ppm |
| Arsenic | 33.5 ppm |
| Barium | <10.0 ppm |
| Beryllium | <0.5 ppm |
| Cadmium | 10.7 ppm |
| Chrome | <.1 ppm |
| Copper | 350 ppm |
| Iron | 13.1 ppm |
| Lead | 3.5 ppm |
| Magnesium | 605 ppm |
| Mercury | <0.0008 ppm |
| Nickel | <4 ppm |
| Thallium | <0.2 ppm |
| Vanadium | <0.2 ppm |
| Zinc | 1,595 ppm |
| $SO_4$ | 55,200 mg/liter |

Total dissolved solids 81,565 mg/liter

A sample taken from the surface level of the Berkeley Pit was found to have the following concentration:

| | |
|---|---|
| Ca | 463 ppm |
| Mg | 452 ppm |
| Pb | 0.048 ppm |
| $SiO_3$ | 103.0 ppm |
| Fe | 373 ppm |
| Mn | 233 ppm |
| Al | 79.9 ppm |
| Ag | <79.9 ppm |
| B | <0.10 ppm |
| Cd | 2300 ppm |
| Cu | 189 ppm |
| Li | 0.272 ppm |
| Mo | <0.040 ppm |
| Ni | 1250 ppm |
| Sr | 1700 ppm |
| As | 0.103 ppm |
| Co | 1440 ppm |
| Cr | 0.041 ppm |
| $SO_4$ | 6930 mg/liter |

OBJECTS OF THE INVENTION

It is an object of this invention to provide a method for removing metals from water in an insoluble form.

It is another object to completely remove anion as well as cation constituents which has the advantage over processes of the prior art wherein the acidifying components are retained in soluble form.

It is another object of this invention to remove metal constituents and convert the constituents in a number of cases to an economically recycled byproduct of the demetallization process. The water is substantially purified (not merely neutralized) and thus creates a second recyclable product, a soil conditioning agent and water. The waste water is thereby neutralized and in a condition suitable for discharging into the ground water system.

SUMMARY

This invention is directed toward a treatment process of acid mine drainage (A.M.D.) which includes the steps:

subjecting the drainage to an electric field between two electrodes;

mixing the A.M.D with a first chemical agent that raises the pH to at least 8.0, said mixing performed in a magnetic field;

allowing the mixture to digest in a chamber for a period of time to allow a sludge to form;

separating the liquid fraction from the solid fraction of the A.M.D. such as by settling and passing the separated sludge through a filter press to produce a filter cake and clarified water solution;

adding a second chemical agent to the water solution to precipitate insoluble sulfates;

adding a thickener and passing the A.M.D. through a filter press to remove precipitated sulfates;

adding a third chemical agent to reduce the pH to slightly basic and precipitate carbonates which are removed with a filter press.

Variations of these steps may be considered which are within the scope of the invention. A preferred embodiment is described in following paragraphs.

Figure 1:
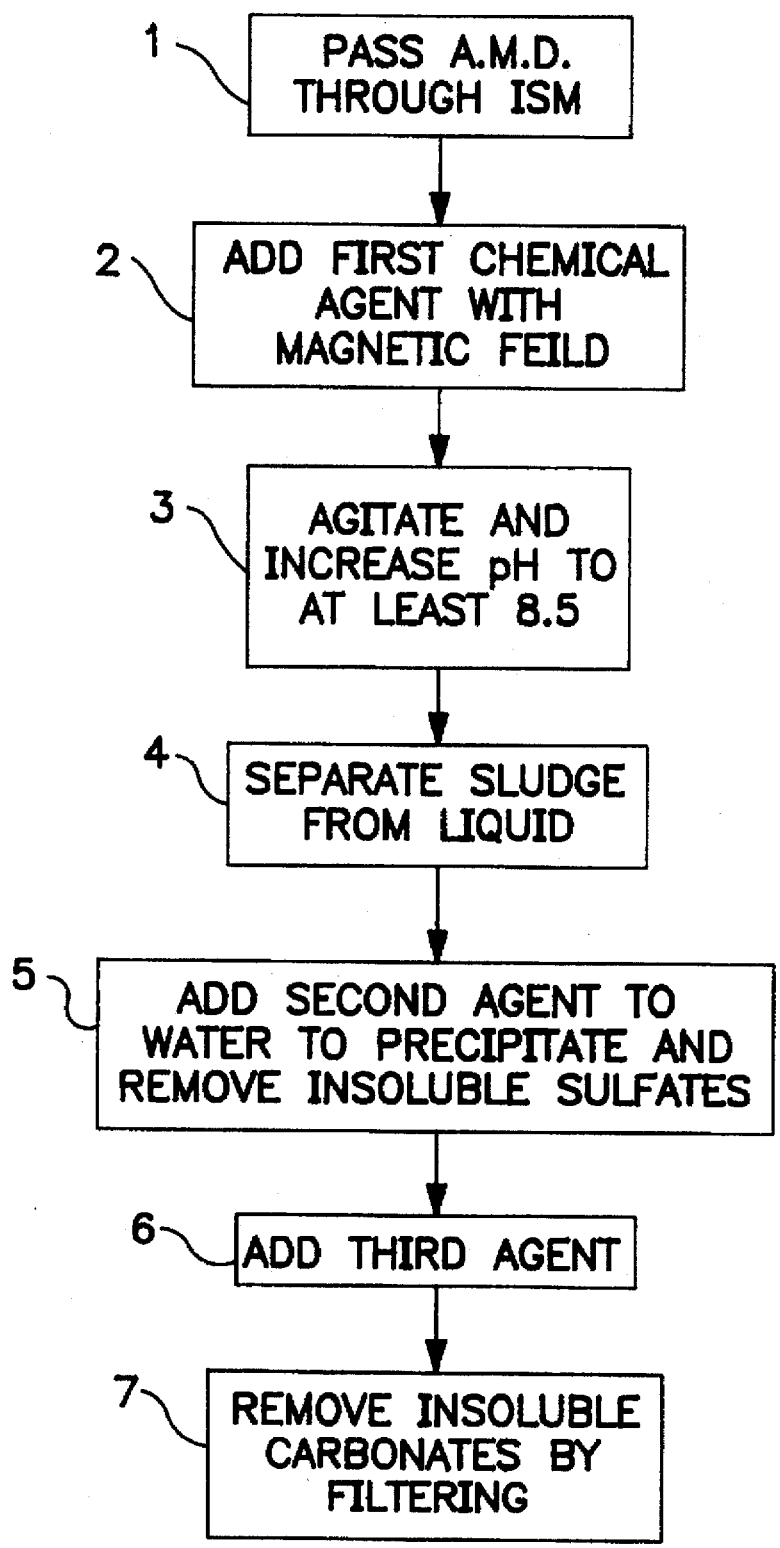
FIG. 1 is a list of steps in performing the method of this invention.

DESCRIPTION OF PREFERRED EMBODIMENTS:

Turning now to a discussion of the drawings, FIG. 1 lists the steps in practicing the method of the invention.

Step 1: A.M.D. is passed serially through a number of "ion state modification" chambers. Each chamber has a pair of electrodes, preferably carbon, across which an electric field is applied. The voltage between the electrodes in each chamber is selected to optimize the "conditioning" of a particular class of ionic species (e.g., single valence, double valence, triple valence).

Step 2: A first chemical agent is added to A.M.D. and mixed in the presence of a magnetic field in a sufficient amount to raise the pH to about 7.5. A preferred first chemical agent is prepared according to steps listed in following paragraphs.

Step 3: The mixture is agitated in a digesting tank for about thirty minutes where a slurry of precipitates is formed and the pH increases to at least 8.5.

Step 4: The A.M.D. enters a settling tank where precipitate is separated as sludge from clarified liquid fraction and the sludge is further dewatered by passage through a filter press. At this point in the process, the original contaminating metal ions have been removed from the A.M.D. and the A.M.D. is said to be "demetalized".

Step 5. The clarified "demetalized" A.M.D. is then mixed with a second agent in sufficient amount to precipitate insoluble sulfates. The precipitated sulfates are separated from the clarified liquid fraction such as by settling and dewatering in a filter press. A prefered second agent is calcium hydroxide which forms calcium sulfate.

Step 6: The clarified A.M.D. is then mixed with a third agent in sufficient amount to adjust the pH to a range of 7.5 to 8.2 and precipitate insoluble carbonates. The preferred third agent is sodium bicarbonate.

Step 7: The insoluble carbonates are filtered from the A.M.D. leaving water that is suitable for discharge into the environment.

Figure 2:
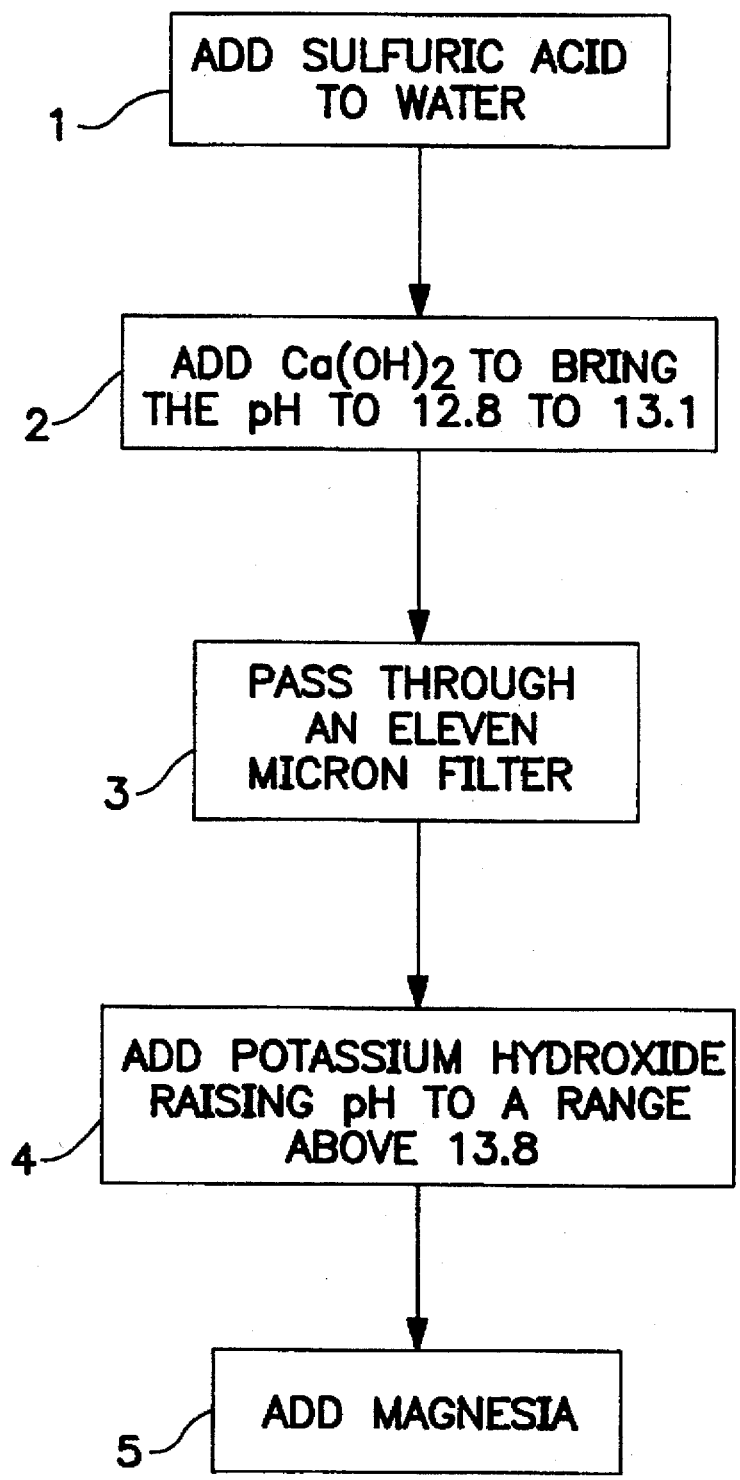
FIG. 2 is a list of steps for preparing the first chemical agent.

FIG. 2 shows the steps for preparing the first chemical agent applied in step 2 of the method of FIG. 1. Referring to FIG. 2:

In step 1, 40 ml of concentrated sulfuric acid (Be 12°) is added to one liter of water.

In step 2, $Ca(OH)_2$ is added to bring the pH of the solution up to a range of 12.8 to 13.1.

In step 3, the solution is passed through an eleven micron filter thereby removing any particulates of $Ca\ SO_4$ larger than eleven microns.

In step 4, sufficient potassium hydroxide is added to bring the pH to a range of 13.8 to 14 thereby producing a base solution.

In step 5, magnesia is added in the amount of 10 grams per one liter of base solution thereby formulating the first chemical agent.

Figure 3:
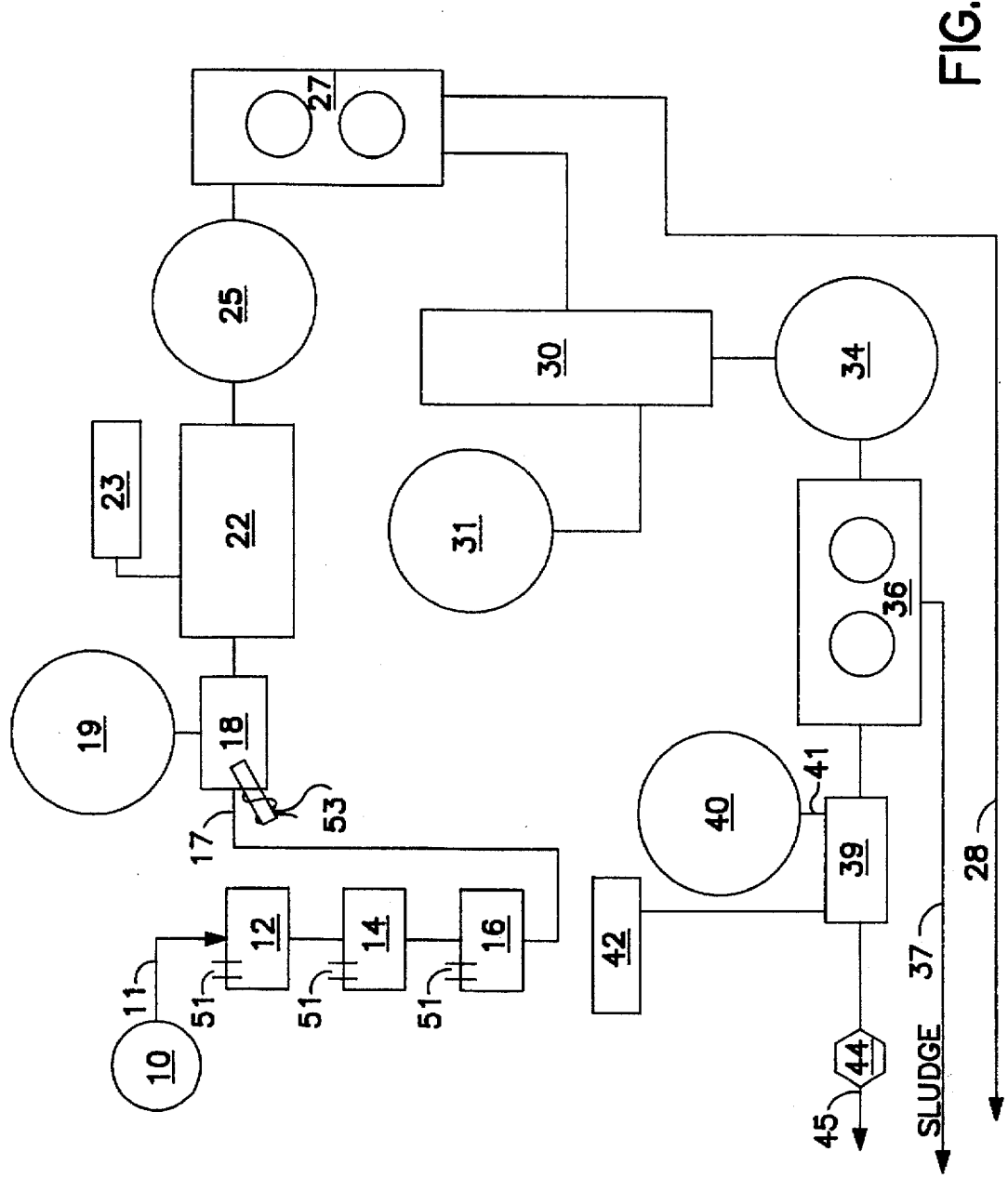
FIG. 3 is a schematic diagram of the apparatus for perfoming the process of FIG. 1.

FIG. 3 shows schematic diagram of the apparatus for performing the steps of the process. There is shown a flow control tank 10 where the flow rate of A.M.D. is controlled and supplied through conduit 11 to three "ion state modification" stations 12, 14 and 16. Each I.S.M. station has a pair of carbon electrodes 51 spaced about 1.5 inches apart. In one embodiment a voltage of 9.5 to 12 volts is impressed across the electrodes of the first I.S.M. station, a voltage of 22.5 to 25 volts is impressed across the electrodes of the second I.S.M. station 14, a voltage of 51.5 to 55 volts is impressed across the electrodes of the third I.S.M. station 16.

The A.M.D. then enters a mixing tank 18 through conduit 17 where a solution of a first chemical agent is added from source 19. The mixing is preferentially performed in the presence of a magnetic field imposed by a magnet array 53. In examples presented in following paragraphs, the plastic mixing tank was six inches in diameter and 13 magnets, each having a strength of 55 kilogauss were arranged in a ring with the north pole of each magnetic in contact with the wall of the tank.

The solution is then passed to a digestion tank 22 where reaction of the constituents continues for about one half hour as the pH rises to about 7.5 as detected by monitor 23. A sludge of precipitated metal oxides and hydroxides forms during this step resulting in a sludge that is permitted to settle out when the mix passes through a settling (thickener) tank 25. A prefered settling tank is of the well known type having inclined surface up which the liquid passes while the heavy precipitate settles downward. The sludge settling out of settling tank 25 passes through a filter press 27 and the dewatered sludge is removed through line 28.

Filtered "demetallized" effluent flows out to chemical mixer 30 where a second chemical agent from reservoir 31 is mixed with the effluent which precipitates out the $SO_4$—. The second chemical agent is prefereably calcium hydroxide so that the precipitate formed is calcium sulfate. The effluent is then passed to a settling unit 34 where the $CaSO_4$ settles from the liquid fraction and is passed through filter press 36. Here the sludge is filtered and compression dried and discharged through line 37.

The effluent enters chemical mixer 38 where a third chemical agent is added from reservoir 40 through conduit 41. The third chemical agent is preferably sodium bicarbonate and is added in an amount sufficient to adjust the pH to a range of 7.5 to 8.2 as indicated by pH sensor 42.

The pH stabilized solution enters filter 44 where the carbonates are removed by filtration and water from which metal contaminants and sulfate radicals have been removed is discharged through line 45.

The following examples are illustrative of the invention.

Example I: Berkeley Pit

A 500 ml sample of A.M.D. (pH=2.9) was treated in "ion state modification" devices which involved immersing carbon electrodes in the solution and applying, successively, voltages of 10 volts, 12 volts, and 54 volts, application of each volage being for a period of 3 minutes. Then the sample was placed in a mixer where MgO was added in the presence of the magnetic field generated by the six magnets positioned as described above. MgO was added in an amount sufficient to raise the pH to about 8.0. The treated solution was allowed to digest for 30 minutes with agitation during which time precipitate was formed. Then the sludge was separated from the liquid fraction with a vacuum filter. TABLE II lists the concentrations of major contaminants measured by an EPA certified laboratory

TABLE II

|  | before treatment | after treatment for removal of metals |
|---|---|---|
| Cadmium | 2.3 ppm | <0.020 ppm (below detectable limits) |
| Cobalt | 1.4 ppm | <0.020 ppm (below detectable limits) |
| Copper | 189.0 ppm | <0.020 ppm (below detectable limits) |
| Nickel | 1250.0 ppm | 0.044 ppm |
| $SO_4$— | 6930.0 ppm | 1700 ppm |

Example II:

A second 500 ml sample of Berkeley Pit Water was treated in the same manner as described in example I. Then the treated water was put through a second process where a second agent, $Ca(OH)_2$ was added causing a white precipitate to form. The $Ca(OH)_2$ was added until no further precipitate was formed.

The sample was analyzed by an independent certified EPA laboratory who provided the following test results listed in TABLE III

TABLE III

|  | untreated sample | after treatment for removal of metals |
|---|---|---|
| Cadmium | 2.3 ppm | <0.020 ppm (below detactable limit) |
| Cobalt | 1.4 ppm | <0.020 ppm (below detactable limit) |
| Copper | 189.0 ppm | <0.020 ppm (below detactable limit) |
| Nickel | 1.2 ppm | 0.030 ppm |
| $SO_4$— | 6930 ppm | 27.0 ppm |

These results are far less than the present limits allowed by the EPA of dumping requirements for metals and below the expected new limits allowed for $SO_4$—. The precipitates from this process have salvage value and do not require treatment as hazardous waste thus eliminating the storage cost and liabilities associated with disposal of hazardous materials.

Example III: IRON MOUNTAIN MINE

A 500 ml sample of Iron Mountain mine water was treated in "ion state modification" devices which involved immersing carbon electrodes in the solution and applying, successively, voltages of 10 volts, 12 volts, and 54 volts, application of each volage being for a period of 3 minutes. Then the sample was placed in a mixer where MgO was added in the presence of a magnetic field as described in Example I. MgO was added in an amount sufficient to raise the pH to about 8.0. The treated solution was allowed to digest for 30 minutes with agitation dining which time precipitate was framed. Then the sludge was separated from the liquid fraction with a vacuum filter. TABLE IV lists the concentrations of major contaminants measured by an EPA certified laboratory.

TABLE IV

|  | before treatment | after treatment for removal of metals |
|---|---|---|
| Cadmium | 10.7 ppm | <0.020 ppm (below detectable limits) |
| Cobalt | <0.5 ppm | <0.020 ppm (below detectable limits) |
| Copper | 350.0 ppm | <0.020 ppm (below detectable limits) |
| Nickel | <4.0 ppm | <0.020 ppm (below detectable limits) |
| Zinc | 1595 ppm | <0.020 ppm (below detectable limits) |
| $SO_4$— | 55,200.0 ppm | 17,000.0 ppm |

Example IV:

A second 500 ml sample of Berkeley Pit Water was treated in the same manner as described in example I. Then the treated water was put through a second process where a second agent, $Ca(OH)_2$ was added causing a white precipitate to form. The $Ca(OH)_2$ was added until no further precipitate was detected.

The sample was analyzed by an independent certified EPA laboratory who provided the test results listed in TABLE V.

TABLE V

|  | untreated sample | after treatment for removal of metals |
|---|---|---|
| Cadmium | 10.7 ppm | <0.020 ppm (below detactable limit) |
| Cobalt | <0.5 ppm | <0.020 ppm (below detactable limit) |
| Copper | 350.0 ppm | <0.020 ppm (below detactable limit) |
| Nickel | <4.0 ppm | <0.020 ppm (below detactable limit) |
| Zinc | 1595 ppm | <0.020 ppm (below detactable limit) |
| $SO_4$— | 6930 ppm | 480.0 ppm |

Example V:

In order to compare the effect of using "Ion State Modification" and mixing in the presence of a magnetic field (Steps 1 and 2 of FIG. 1) samples were prepared without the applied electric field of step 1 and without the magnetic field of step 2 and the concentrations of contaminating ions was measured as shown in TABLE VII.

TABLE VII

|  | untreated sample | after treatment |
|---|---|---|
| Nickel | 1250.0 ppm | 300 ppm |
| Copper | 189.0 ppm | 30 ppm |

A comparison of Example V to Examples I and IV demonstrate the effectiveness of applying steps 1 and 2 of FIG. 1 in improving the efficiency of removing the metal ions.

The results of these collective processes for lowering dissolved metals and sulfates are far less than the present limits allowed by the EPA of dumping requirements for metals and sulfates. The precipitates from this process have salvage value and do not present any toxic hazard. These materials do not require treatment as hazardous waste thus eliminating the storage cost and liabilities associated with disposal of hazardous materials.

The steps of applying the "ion state modification" treatment (subjecting the A.M.D. to an electric field between carbon electrodes) and subjecting the A.M.D. to a magnetic field while stirring have proven to be essential for achieving the high level of purity of the effluent (water). A major benefit of the process is that the pH of the A.M.D. need not be raised to the high value that characterizes state of the art processes and therefore do not require discharge of effluent having a high pH or reduction of levels of constituents such as sodium as is required by state of the art processes.

Although we do not wish to be bound by theory, it is believed that the following remarks explain the function of these steps in upgrading the effectiveness of the present process.

Acid Mine Drainage contains high concentrations of both heavy and light metal ions, each ion species having its own electronegativity. Electronegativity of an ion is a measure of its interaction with a nearest neighbor. In an aqueous solution, electronegativity is a measure of the ability of the ion to attract the surropunding polar water molecules. The water molecules surround and, to some degree, are bonded to the ion forming a layer of molecules referred to as the "hydration cage". These water molecules form a layer which affects the behavior of the ion. The hydration cage can significantly inhibit in some cases or promote in other cases the ability of the ion to take part in standard chemical reactions. We believe that the application of the electric (step 1) and magnetic (step 2) fields alters the hydration cage and modifies the degree of behavior of any particular ion in the chemical environment. Formation energies and activation energies are altered to the extent that precipitates of non-naturally occurring metal hydroxides form.

Variations and modifications may be considered in view of the specification and drawings as being best suited for some situations which are within the scope of the invention. For example, electrodes other than carbon electrodes may be used in place of carbon electrodes. Barium hydroxides may be considered in place of calcium hydroxides as an agent to remove sulfates. We therefore wish to define the scope of the invention by the appended claims and in view of the specification if need be.

What is claimed is:

1. A method for removing contaminating metal ions and sulfate ions from an acidic aqueous solution which includes the steps performed in operable order:

I. passing the solution between at least one pair of electrodes having a voltage applied between each pair of said at least one pair of electrodes wherein said voltage is selected to condition at least one of said ions to form precipitate when a pH of said solution is subsequently raised to a value selected to precipitate said conditioned ions;

II. adding to said solution a first chemical agent selected to raise a pH of said solution and agitating said solution until the pH of said solution increases to said value whereby a slurry of precipitate of metal ions forms;

III. discharging said solution into a first means for separating said precipitate from a clarified aqueous liquid fraction such as to substantially remove said contaminating metal ions from said clarified aqueous liquid fraction;

IV. mixing said liquid fraction with a second agent selected to precipitate said sulfate ions as insoluble sulfates, V. passing said liquid fraction containing said insoluble sulfates through a second means for separating said precipitated sulfates from said liquid fraction whereby said precipitated sulfates are separated from said liquid fraction.

2. A method for removing contaminating metal ions and sulfate ions from an acidic aqueous solution which includes the steps performed in operable order:

I. passing the solution between at least one pair of electrodes having a voltage applied between each pair of said at least one pair of electrodes wherein said voltage is selected to condition at least one of said ions to form precipitate when a pH of said solution is subsequently raised to a value selected to precipitate said conditioned ions;

II. adding to said solution a first chemical agent formulated by the steps:
      (i) adding 40 ml of concentrated sulfuric acid to each one liter of water;
      (ii) adding $Ca(OH)_2$ to bring the pH of the acid in water solution up to a range of 12.8 to 13.1;
      (iii) passing said acid in water solution through an eleven micron filter thereby removing any particulates of $Ca\ SO_4$ larger than eleven micron;
      (iv) adding sufficient potassium hydroxide to bring the pH of said acid in water solution to a range of 13.8 to 14 thereby producing a base solution;
      (v) adding magnesia in an amount of 10 grams per one liter of base solution, and agitating said solution until the pH of said solution increases to a value of 8.5 whereby a slurry of precipitate of metal ions forms;

III. discharging said solution into a first means for separating said precipitate of metal ions from a clarified aqueous liquid fraction such as to substantially remove said contaminating metal ions from said clarified aqueous liquid fraction;

IV. mixing said liquid fraction with a second agent selected to precipitate said sulfate ions as insoluble sulfates.

V. passing said liquid fraction containing said insoluble sulfates through a second means for separating the precipitated sulfates from said liquid fraction whereby said precipitated sulfates are spearated from said liquid fraction.

3. The method of claim 1 wherein said step (II) includes the step of mixing said first chemical agent in the presence of a magnetic field.

4. The method of claim 1 wherein said step (IV) includes the step of selecting said second agent to be one of calcium hydroxide and calcium oxide.

5. The method of claim 1 wherein step (III) includes the step of selecting said first means for separating to be at least one of:
   (i) a settling tank;
   (ii) a filer press,
and wherein step V includes the step of selecting said second means for separating to be at least one of:
   (i) a settling tank;
   (ii) a filter press.

6. The method of claim 1 which comprises the step after step V:

VI. mixing said liquid fraction with a third agent in sufficient amount and selected to adjust the pH to a range of 7.5 to 8.2 and precipitate insoluble carbonates.

7. The method of claim 6 which comprises passing said liquid fraction containing insoluble carbonates through a third means for separating said insoluble carbonates from said liquid fraction.

8. The method of claim 6 which includes the step of selecting said third agent to be sodium bicarbonate.

9. The method of claim 1 which includes the step of selecting said electrodes to be carbon.

10. The method of claim 1 which includes the step of said at least one pair of electrodes being a first pair, and a second pair and a third pair of electrodes and a first value of said voltage applied between said first pair of elctrodes is in a range of 9.0 to 12.0 volts, a second value of said voltage applied between said second pair of electrodes is in a range of 22 to 24 volts, and a third value of voltage between said third pair of electrodes is in a range of 50 to 55 volts.

11. The method of claim 1 wherein said conditioned ions form precipitate when a pH of said solution is subsequently raised to a value of 8.5.

* * * * *